US012600597B2

(12) United States Patent
Tseng et al.

(10) Patent No.: US 12,600,597 B2
(45) Date of Patent: Apr. 14, 2026

(54) METHOD OF ESTIMATING AND COMPENSATING INTERFERENCE TORQUE OF LIFTING SYSTEM

(71) Applicant: DELTA ELECTRONICS, INC., Taoyuan City (TW)

(72) Inventors: Shao-Kai Tseng, Taoyuan City (TW); Yuan-Qi Hsu, Taoyuan City (TW); Ming-Tong Chuang, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 1009 days.

(21) Appl. No.: 17/742,181

(22) Filed: May 11, 2022

(65) Prior Publication Data

US 2023/0150793 A1 May 18, 2023

(30) Foreign Application Priority Data

Nov. 12, 2021 (CN) .......................... 202111337189.X

(51) Int. Cl.
B66B 1/30 (2006.01)
B66B 1/34 (2006.01)
H02P 23/24 (2016.01)

(52) U.S. Cl.
CPC .............. B66B 1/30 (2013.01); B66B 1/3476 (2013.01); H02P 23/24 (2016.02)

(58) Field of Classification Search
CPC .......... B66B 1/30; B66B 1/3476; H02P 23/24

USPC .......................................................... 187/289
See application file for complete search history.

(56) References Cited

U.S. PATENT DOCUMENTS 5,828,014 A     10/1998  Goto et al.
5,880,416 A  *   3/1999  Colby ..................... B66B 1/285
                                                              187/293

FOREIGN PATENT DOCUMENTS

CN        101531302 A      9/2009
CN        111731957 A  *  10/2020  ............. B66B 1/304
CN        111807169 A  *  10/2020  ........... B66B 1/3415
CN        117940362 A  *   4/2024  ............... B66B 7/08
JP      2015-224127 A     12/2015

* cited by examiner

*Primary Examiner* — Kawing Chan

(74) *Attorney, Agent, or Firm* — Muncy, Geissler, Olds & Lowe, P.C.

(57) ABSTRACT

A method of estimating and compensating an interference torque of a lifting system includes steps of: continuously integrating a speed of a motor and specifying an integration value to be zero if the integration value is negative when the elevator car moves upward and downward in a hoist way; estimating a rope load constant of a wire rope according to an initial position and a maximum travel position, and calculating a rope load torque according to the maximum travel position, the rope load constant and a present position of the motor; estimating a car and counterweight load torque according to a car weight of the elevator car and a counterweight weight; estimating an interference torque according to the rope load torque and the car and counterweight load torque, and performing a feedforward compensation to the motor based on the interference torque.

14 Claims, 12 Drawing Sheets

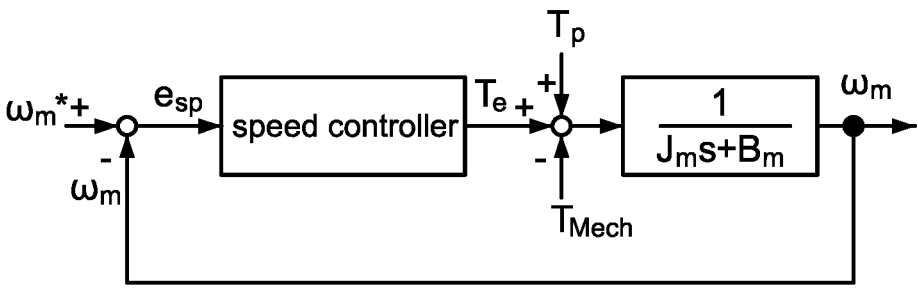

FIG.2 start continuously integrating a speed of the motor and
specifying an integration value to be zero if the integration
value is negative when the elevator car moves upward and
downward between a top and a bottom of the hoistway from
an initial position to acquire a maximum travel position — S11 estimating a rope load constant of the wire rope according
to the initial position and the maximum travel position when
the motor operates at a constant speed, and calculating a
rope load torque according to the maximum travel position,
the rope load constant, and a present positon of the motor — S12 estimating a car and counterweight load torque according to
a car weight of the elevator car and a counterweight weight
when the motor operates at a zero speed — S13 estimating an interference torque according to the rope load
torque and the car and counterweight load torque, and
performing a feedforward compensation to the motor based
on the interference torque — S14 end

FIG.3A

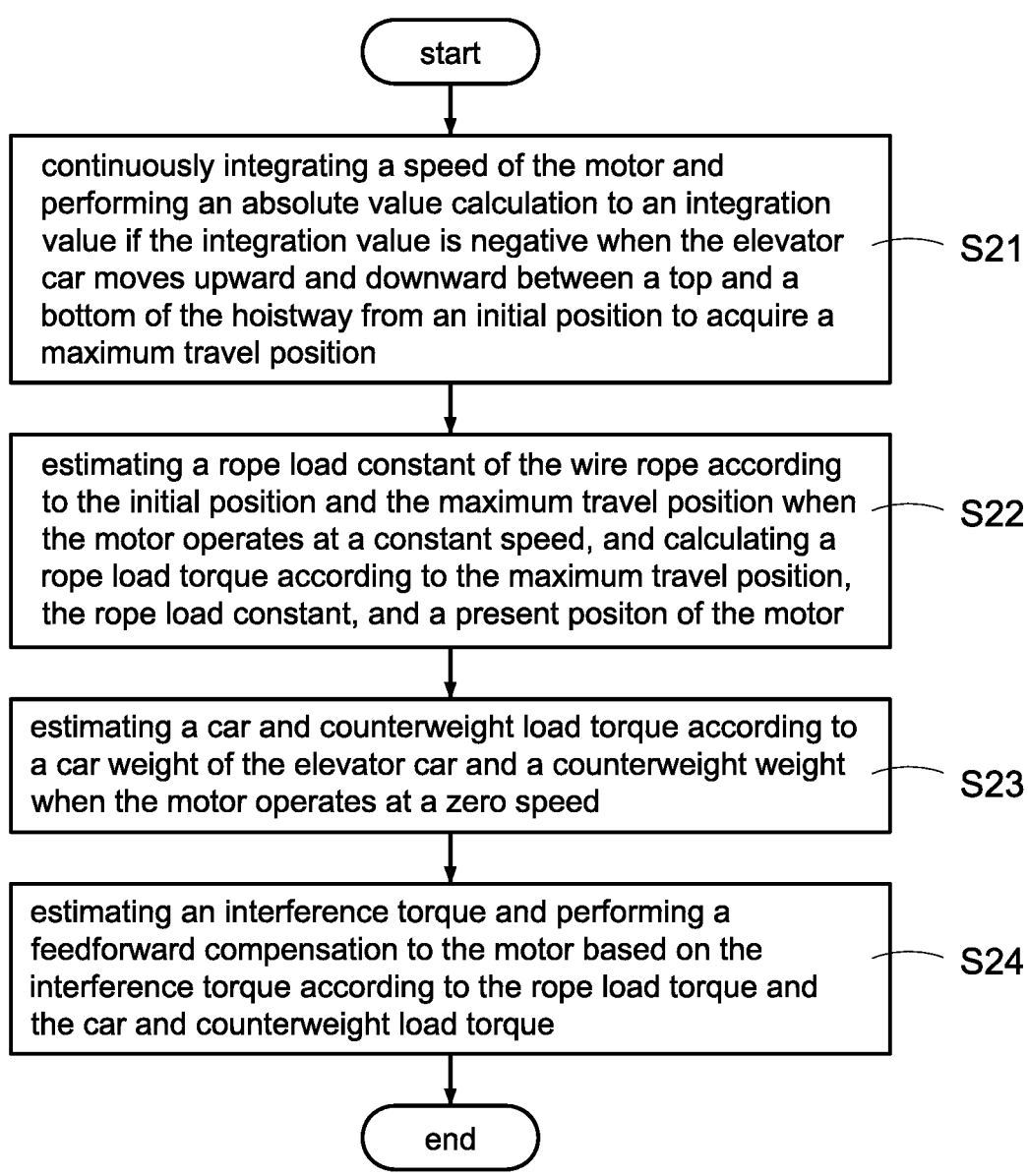

start continuously integrating a speed of the motor and
performing an absolute value calculation to an integration
value if the integration value is negative when the elevator
car moves upward and downward between a top and a
bottom of the hoistway from an initial position to acquire a
maximum travel position — S21 estimating a rope load constant of the wire rope according
to the initial position and the maximum travel position when
the motor operates at a constant speed, and calculating a
rope load torque according to the maximum travel position,
the rope load constant, and a present positon of the motor — S22 estimating a car and counterweight load torque according to
a car weight of the elevator car and a counterweight weight
when the motor operates at a zero speed — S23 estimating an interference torque and performing a
feedforward compensation to the motor based on the
interference torque according to the rope load torque and
the car and counterweight load torque — S24 end

FIG.3B

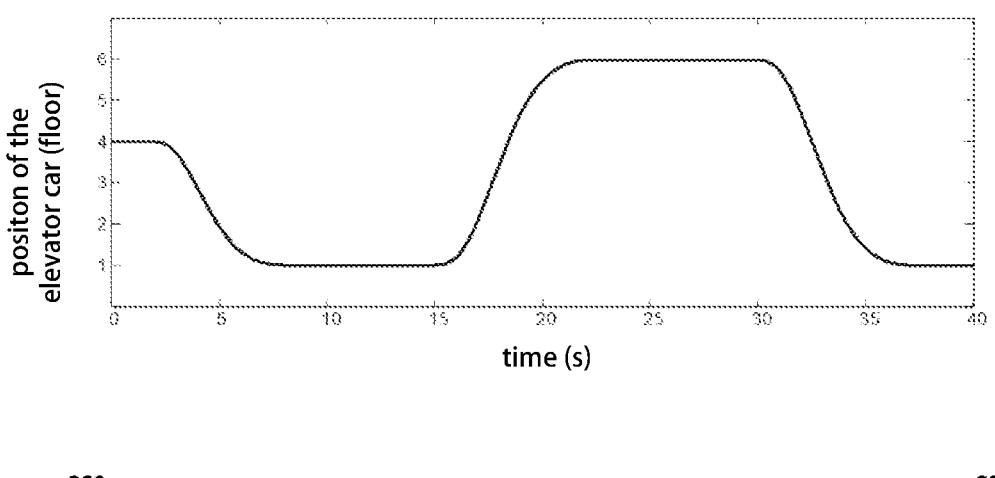
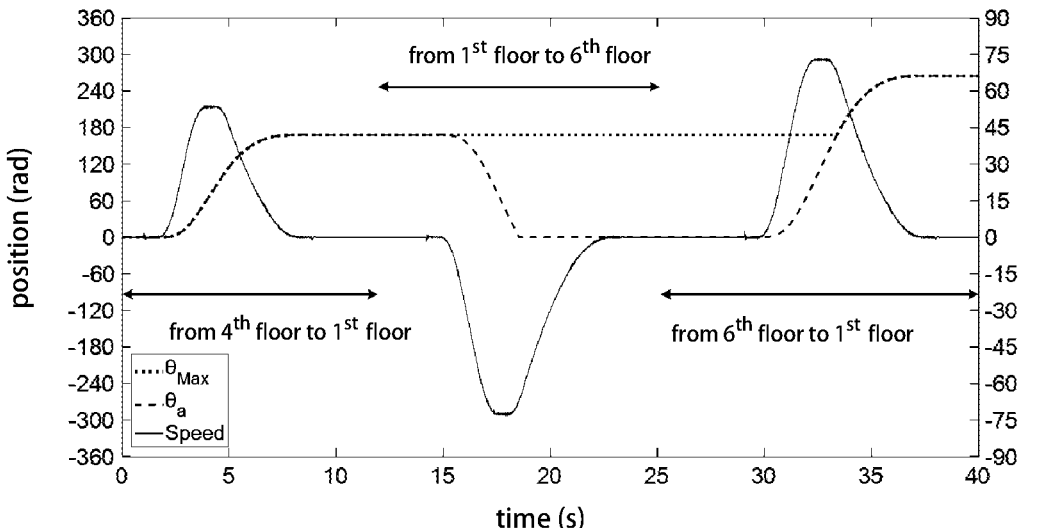
FIG.6

METHOD OF ESTIMATING AND COMPENSATING INTERFERENCE TORQUE OF LIFTING SYSTEM

BACKGROUND

Technical Field

The present disclosure relates to a method of estimating and compensating an interference torque of a lifting system, and more particularly to a method of estimating and compensating an interference torque of a lifting system according to a rope load torque and a car and counterweight load torque.

Description of Related Art

The statements in this section merely provide background information related to the present disclosure and do not necessarily constitute prior art.

Electric motors (such as motors) are driven by converters and have been widely used in lifting systems such as elevators, cranes, and warehouses. In order to improve the operation performance of the lifting system, the relevant mechanical parameters of the system are generally used to design a speed controller to meet the performance requirements during operation.

Taking the elevator system as an example, the length of the wire rope, such as steel cable, is also different due to the different floors of the elevator car. When the elevator car is moving, the change in the length of the wire rope across both sides of the traction wheel produces a fluctuating interference torque for the motor and the controller, which affects the control performance and passengers' ride feeling.

SUMMARY

An object of the present disclosure is to provide a method of estimating and compensating an interference torque of a lifting system to solve the problems of existing technology.

In order to achieve the above-mentioned object, the method of estimating and compensating the interference torque of the lifting system is applied to a motor for driving the lifting system. The motor drives a traction wheel to rotate, and a wire rope across the traction wheel drives an elevator car to move upward and downward in a hoistway. The method of estimating and compensating the interference torque includes steps of: (a) continuously integrating a speed of the motor and specifying an integration value to be zero if the integration value is negative when the elevator car moves upward and downward between a top and a bottom of the hoistway from an initial position to acquire a maximum travel position of the elevator car in the hoistway, (b) estimating a rope load constant of the wire rope according to the initial position and the maximum travel position when the motor operates at a constant speed, and calculating a rope load torque according to the maximum travel position, the rope load constant, and a present position of the motor, (c) estimating a car and counterweight load torque according to a car weight of the elevator car and a counterweight weight when the motor operates at a zero speed, and (d) estimating an interference torque according to the rope load torque and the car and counterweight load torque, and performing a feedforward compensation to the motor based on the interference torque.

In one embodiment, the step (a) includes steps of: (a1) continuously calculating the integration value when the elevator car moves from the initial position to the top, and specifying the integration value to be zero if the integration value is negative, and (a2) controlling the elevator car to move reversely to the bottom when the elevator car moves to the top, and continuously integrating the integration value, and the integration value acquired by calculating the speed when the elevator car moves from the top to the bottom has a maximum value, and the maximum value is the maximum travel position.

In one embodiment, the step (a) includes steps of: (a1) continuously calculating and updating the integration value when the elevator car moves from the initial position to the bottom, (a2) controlling the elevator car to move reversely to the top when the elevator car moves to the bottom and continuously integrating the integration value, and specifying the integration value to be zero if the integration value is negative, and (a3) controlling the elevator car to move reversely to the bottom when the elevator car moves to the top and continuously integrating the integration value, and the integration value acquired by calculating the speed when the elevator car moves from the top to the bottom has a maximum value, and the maximum value is the maximum travel position.

In one embodiment, the step (d) includes steps of: (d1) estimating the interference torque according to the rope load torque and the car and counterweight load torque, (d2) calculating a compensation torque for the feedforward compensation to the motor according to the interference torque, and (d3) completing the feedforward compensation in a time interval according to the compensation torque under the zero speed control.

In one embodiment, the time interval is a difference between the present time and a releasing time of the lifting system; in the step (d3), calculates a compensation current slope according to the compensation torque and the time interval, and completes the feedforward compensation of the compensation torque in the time interval according to the compensation current slope.

In one embodiment, the step (d) is performed when the elevator car is empty.

In one embodiment, the elevator car further includes a weight sensor, and the weight sensor senses a passenger load torque generated by the weight of passengers. In the step (d), estimates the interference torque relative to the motor according to the rope load torque, the car and counterweight load torque, and the passenger load torque.

Another object of the present disclosure is to provide a method of estimating and compensating an interference torque of a lifting system to solve the problems of existing technology.

In order to achieve the above-mentioned object, the method of estimating and compensating the interference torque of the lifting system is applied to a motor for driving the lifting system. The motor drives a traction wheel to rotate, and a wire rope across the traction wheel drives an elevator car to move upward and downward in a hoistway. The method of estimating and compensating the interference torque includes steps of: (a) continuously integrating a speed of the motor and performing an absolute value calculation to an integration value if the integration value is negative when the elevator car moves upward and downward between a top and a bottom of the hoistway from an initial position to acquire a maximum travel position of the elevator car in the hoistway, (b) estimating a rope load constant of the wire rope according to the initial position and the maximum travel position when the motor operates at a constant speed, and calculating a rope load torque according to the maximum travel position, the rope load constant, and a present position of the motor, (c) estimating a car and counterweight load torque according to a car weight of the elevator car and a counterweight weight when the motor operates at a zero speed, and (d) estimating an interference torque and performing a feedforward compensation to the motor based on the interference torque according to the rope load torque and the car and counterweight load torque.

In one embodiment, the step (a) includes steps of: (a1) continuously calculating and updating the integration value when the elevator car moves from the initial position to the top, performing the absolute value calculation to the integration value if the integration value is negative, and recording the integration value as an upward position when the elevator car moves to the top, (a2) controlling the elevator car to move reversely to the bottom, starting continuously to calculate and update the integration value when the elevator car moves through the initial position, and recording the integration value as a downward position until the elevator car moves to the bottom, and (a3) acquiring the maximum travel position by according to the sum of the upward position and the downward position.

In one embodiment, the step (a) includes steps of: (a1) continuously calculating and updating the integration value when the elevator car moves downward from the initial position to the bottom, and recording the integration value as a downward position when the elevator car moves to the bottom, (a2) controlling the elevator car to move reversely to the top, starting continuously to calculate and update the integration value when the elevator car moves through the initial position, performing the absolute value calculation to the integration value if the integration value is negative, and recording the integration value as an upward position until the elevator car moves to the top, and (a3) acquiring the maximum travel position by according to the sum of the upward position and the downward position.

Accordingly, the present disclosure provides different load torque estimators, including: (i) the estimation of floor or position of the elevator car, (ii) the estimation of the rope load constant for unbalanced load torque at two sides of the wire rope across the traction wheel, and (iii) the estimation for unbalanced load torque caused by weights between the elevator car and the counterweight. The torque can be estimated before the elevator car is released and the rope length changes on both sides of the traction wheel as the height of the elevator car changes during the traveling process of the wire rope. Therefore, the torque feedforward compensation can be directly performed during the travel process through the rope load estimation so as to reduce the influence of the interference torque on the speed controller. In addition, through the feedforward torque compensation before the brake is released, the noise generated by the instantaneous current change after the brake is released can be effectively reduced, and the passengers' ride feeling can be effectively increased.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows:

FIG. 2 is a block diagram of a first-order closed-loop speed control architecture according to the present disclosure.

FIG. 3A is a flowchart of a method of estimating and compensating an interference torque of the lifting system according to a first embodiment of the present disclosure.

FIG. 3B is a flowchart of the method of estimating and compensating the interference torque of the lifting system according to a second embodiment of the present disclosure.

FIG. 6 is a schematic waveform of acquiring the maximum travel position according to a second implement of the first embodiment of the present disclosure.

DETAILED DESCRIPTION

Figure 1A:
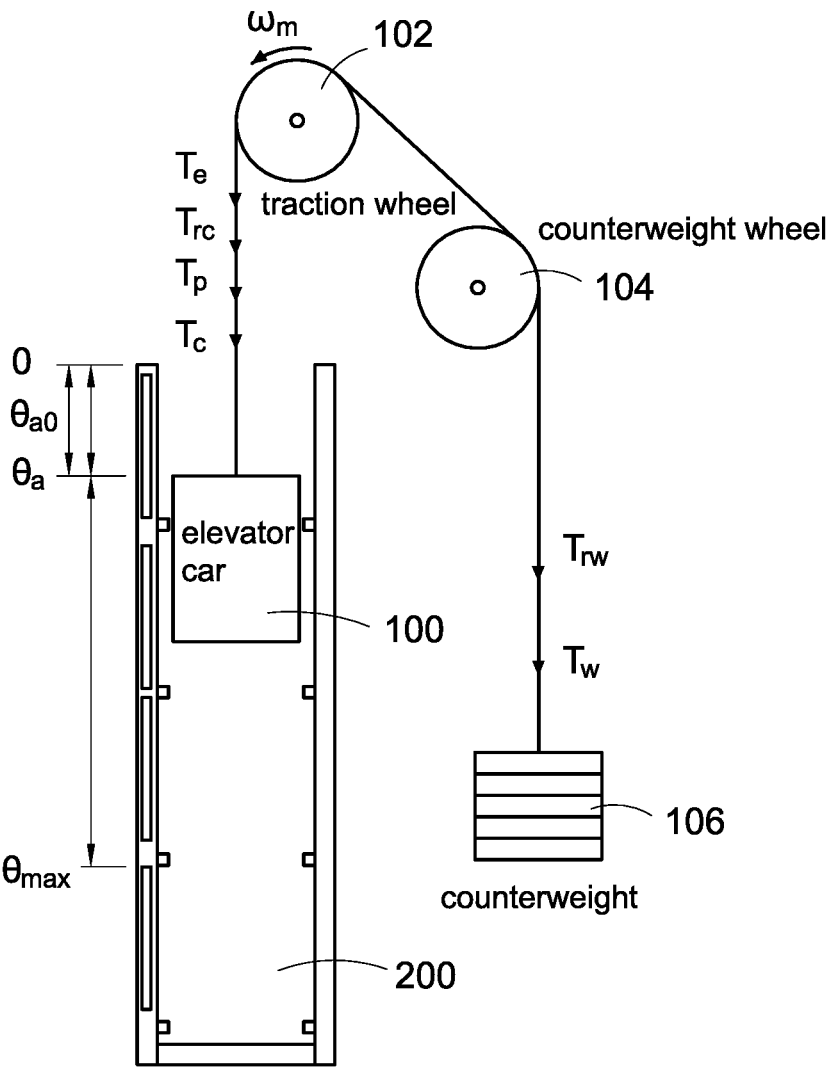
FIG. 1A is a schematic diagram of a lifting system according to the present disclosure.

Reference will now be made to the drawing figures to describe the present disclosure in detail. It will be understood that the drawing figures and exemplified embodiments of present disclosure are not limited to the details thereof.

Figure 1B:
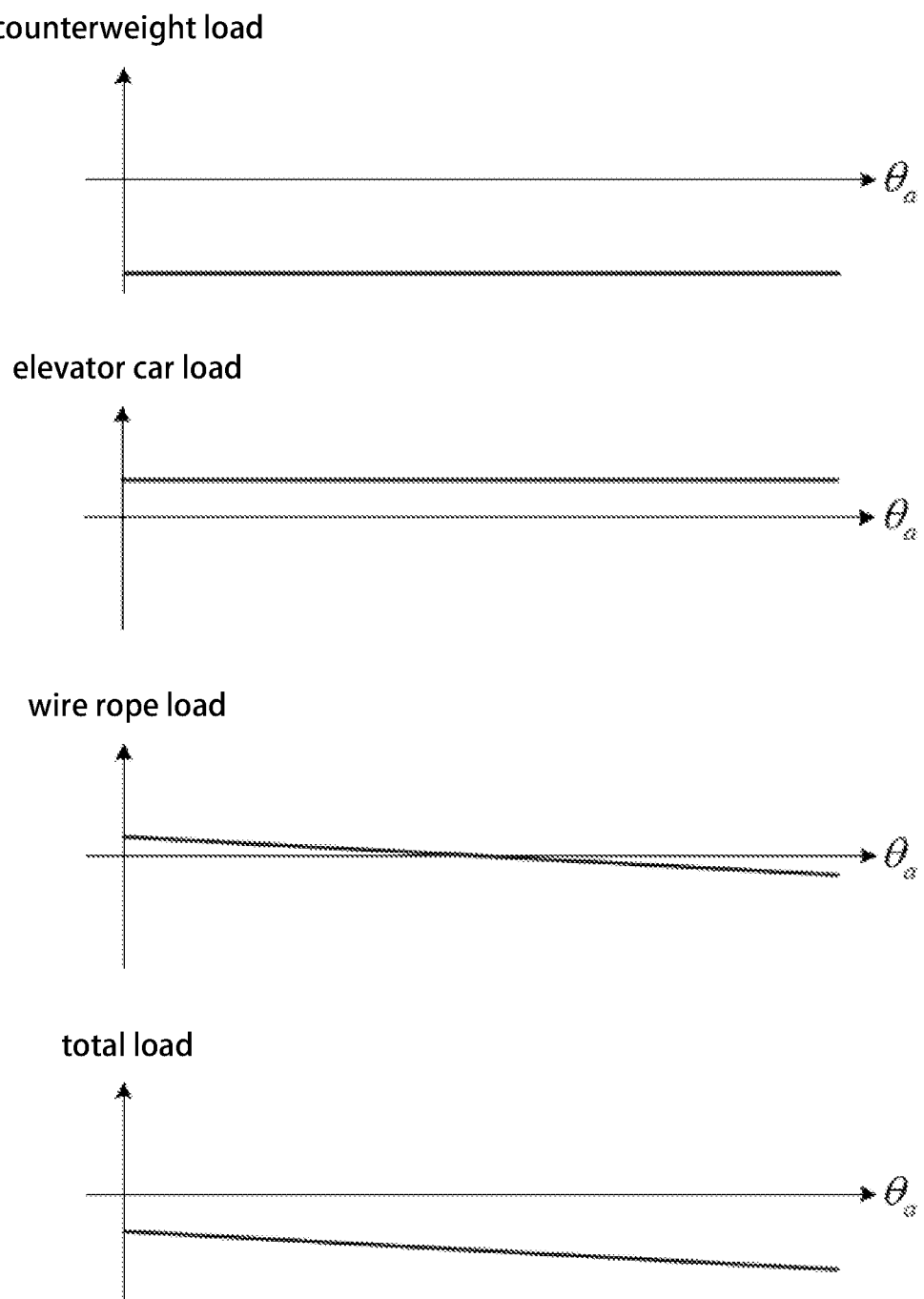
FIG. 1B is a schematic diagram of the interference torque changing with the position of an elevator car according to the present disclosure.

Please refer to FIG. 1A and FIG. 1B, which respectively show a schematic diagram of a lifting system according to the present disclosure and a schematic diagram of the interference torque changing with the position of an elevator car according to the present disclosure. In the present disclosure, take an elevator system as an example of the lifting system, but the present disclosure is not limited by this, that is, a crane or a warehouse system is also available. The elevator system mainly includes an elevator car 100 in a hoistway 200, a traction wheel 102, a counterweight wheel 104, and a counterweight 106. The traction wheel 102 is driven by a motor to rotate so that a wire rope (or a steel cable) across the traction wheel 102 drives the elevator car 100 to move upward and downward in the hoistway 200. Two ends of the wire rope are mechanically connected to the elevator car 100 and the counterweight 106 respectively. Since the elevator car 100 moves upward and downward on different floor positions, the length of two sides of the wire rope driven by the motor is usually different, resulting in different rope weights on both sides across the traction wheel 102, which will generate interference torque relative to the operation of the motor. For example, when the elevator car 100 is on a relatively lower floor, the length of the wire rope on the side of the elevator car 100 is longer, that is, the loading on the wire rope on the side of the elevator car 100 is heavier. Conversely, when the elevator car 100 is on a relatively higher floor, the length of the wire rope on the side of the counterweight 106 is longer, that is, the loading on the wire rope on the side of the counterweight 106 is heavier.

As shown in FIG. 1A, for the motor that drives the traction wheel 102, the elevator car 100 is on the left side and the counterweight 106 is on the right side, and the loading given to the motor by the two devices does not change with time. Only when the position of the elevator car 100 in the hoistway 200 changes with time, the length of the wire rope on both sides of the traction wheel 102 changes due to the height change of the elevator car 100, and therefore the change in the rope weight of the wire rope on both sides of the traction wheel 102 and the difference in the rope weight on both sides cause the change of the interference torque relative to the motor. Specifically, charts as shown in FIG. 1B from top to bottom, they are the relationship between the counterweight loading relative to the motor and the car position $\theta_a$, the relationship between the car loading and the car position $\theta_a$, the relationship between the rope loading and the car position $\theta_a$, and the relationship between the total (interference) loading and the car position $\theta_a$. Therefore, the purpose of the present disclosure is to estimate the rope load torque according to the status of the length on both sides of the wire rope relative to the motor based on the floor position of the elevator car 100, and estimate the car and counterweight load torque according to the weight difference between the elevator car 100 and the counterweight 106. Accordingly, the interference torque of the lifting system relative to the motor can be estimated, and the feedforward compensation for the motor based on the interference torque is performed, that is, the torque compensation provided before the motor starts to rotate makes the motor start and run more smoothly.

Please refer to FIG. 2, which shows a block diagram of a first-order closed-loop speed control architecture according to the present disclosure. The closed-loop speed control architecture includes a speed controller, and the speed controller outputs a control amount to control a controlled plant. In one embodiment, the controlled plant is a motor, which is represented by a first-order closed-loop control system. Since the torque outputted by the motor (i.e., the output torque of the motor) needs to overcome the mechanical interference amount $T_{Mech}$ first, and then to control the operation of the system, if the mechanical interference amount $T_{Mech}$ can be estimated and compensated first, the remaining loading change is the weight of passengers when entering and leaving the elevator. In other words, the generalized mechanical interference amount $T_{Mech}$ may include the unbalanced torque of the wire rope, the loading torque of the elevator car 100, the loading torque of the counterweight 106, and the interference torque relative to the motor caused by the weight of passengers in the elevator car 100. However, since the weight of the passengers in the elevator car 100 is an unpredictable amount of change, the interference torque caused by the fixed mechanical parts such as the wire rope, the elevator car 100, and the counterweight 106 after the elevator system has been built may be estimated and pre-compensated first to simplify the subsequent control.

Please refer to FIG. 3A, which shows a flowchart of a method of estimating and compensating an interference torque of the lifting system according to a first embodiment of the present disclosure. The method of estimating and compensating the interference torque of the lifting system is applied to a motor for driving the lifting system, and includes steps as follows.

First, continuously integrating a speed $\omega_m$ of the motor and specifying an integration value to be zero if the integration value acquired by integrating the speed $\omega_m$ is negative when the elevator car 100 moves upward and downward between a top and a bottom of the hoistway 200 from an initial position $\theta_{a0}$ to acquire a maximum travel position $\theta_{Max}$ (S11). In other words, the step (S11) is mainly used to acquire the information of the maximum travel position $\theta_{Max}$ of the elevator car in the hoistway 200. The first embodiment of the present disclosure proposes two specific implementations for acquiring the information of the maximum travel position $\theta_{Max}$, which will be described later. Afterward, estimating a rope load constant of the wire rope according to the initial position $\theta_{a0}$ and the maximum travel position $\theta_{Max}$ when the motor operates at a constant speed, and calculating a rope load torque relative to the motor according to the maximum travel position $\theta_{Max}$, the rope load constant, and a present position $\theta_a$ of the motor (S12). Afterward, estimating a car and counterweight load torque relative to the motor according to a car weight of the elevator car 100 and a counterweight weight of the counterweight 106 when the motor operates at a zero speed (S13). Finally, estimating an interference torque relative to the motor according to the rope load torque and the car and counterweight load torque, and performing a feedforward compensation to the motor based on the interference torque (S14), wherein this step (S14) can be performed when the elevator car is empty or unloaded. In particular, the steps (S11) to (S14) will be described in detail with the drawings hereinafter.

Please refer to FIG. 3B, which shows a flowchart of the method of estimating and compensating the interference torque of the lifting system according to a second embodiment of the present disclosure. Compared to the first embodiment (shown in FIG. 3A) of the present disclosure, in the second embodiment, only the step S21 is different from the step S11, and the other steps (S22~S24 and S12~S14) are the same and correspond to each other. The step S21 of the second embodiment is: continuously integrating a speed $\omega_m$ of the motor and performing an absolute value calculation to an integration value if the integration value is negative when the elevator car 100 moves upward and downward between a top and a bottom of the hoistway 200 from an initial position $\theta_{a0}$ to acquire the maximum travel position $\theta_{Max}$.

Figure 3C:
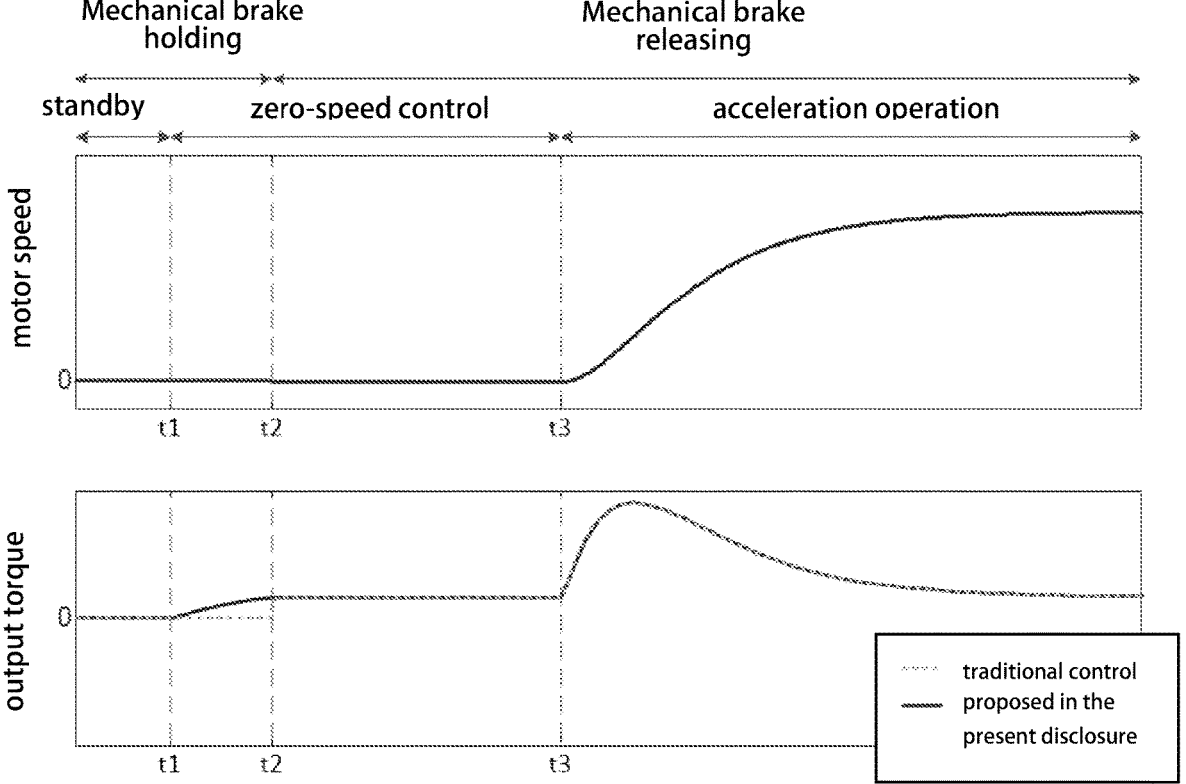
FIG. 3C is a schematic diagram of a feedforward compensation of the lifting system according to the present disclosure.

Please refer to FIG. 3C, which shows a schematic diagram of a feedforward compensation of the lifting system according to the present disclosure. If there is no feedforward compensation, a large current needs to be output instantaneously after the brake is released, which will have a larger current slope and generate electromagnetic noise. On the contrary, if the compensation time of the feedforward compensation is too late, for example, the current planning is made after the brake is already released, it will be too late to compensate for enough torque to cause the elevator car to rollback. Therefore, the feedforward compensation method of the present disclosure is: estimating the interference torque based on the rope load torque and the car and counterweight load torque, and then performing the feedforward compensation to the motor based on the interference torque (approximately completed between time t1 and time t2). Also, according to the compensation torque under the zero-speed control, the feedforward compensation is completed in the time interval (approximately completed between time t2 and time t3). Specifically, the compensation current slope is calculated according to the compensation torque and time interval, and the feedforward compensation of the compensation torque is completed by compensating the current in the time interval according to the compensation current slope. The time interval is the difference between the present time and the brake-releasing time of the lifting system. Through the above method, the feedforward compensation method will not be completed immediately before the brake is released or performed too late after the brake is released, and the application of the compensation current is planned to be smooth, which can reduce noise and avoid rollback.

As mentioned above, the present disclosure is mainly based on the converter for motor control, however the converter cannot acquire the information of the floor where the elevator car 100 is located. Therefore, the maximum travel position $\theta_{Max}$ of the elevator car 100 may only be estimated through information such as the length (distance) of the hoistway 200, the motor speed, etc. Furthermore, since the load torque generated by the difference in the length of the two sides of the wire rope across the traction wheel 102 is related to the position or floor of the elevator car 100, the converter used in the general control method cannot realize the actual position of the elevator car 100 so that the position of the elevator car 100 must be estimated first before estimating and compensating the rope load torque.

Without considering the rope slip, the move distance of the elevator car 100 is the same as the angle of the traction rotation of the motor, and therefore the estimated value of the position (estimated position) of the elevator car 100 can be acquired by integrating the speed of the motor, expressed as equation (1).

$$\omega_m dt = \theta_a + \theta_{a0} \qquad \text{equation (1)}$$

In which, $\theta_a$ is the present position of the elevator car 100, $\theta_{a0}$ is the initial position of the elevator car 100, and $\omega_m$ is the present speed of the motor. Therefore, the estimated position of the elevator car 100 can be acquired by integrating the speed of the motor through equation (1). In other words, there is no need to know the parameter values of the mechanical equipment (such as the wheel diameter of the traction wheel 102, the wheel diameter of the counterweight wheel 104, etc.), and the calculation of conversion from circular motion to linear motion may be omitted.

In the following, different embodiments for acquiring the maximum travel position $\theta_{Max}$ of the elevator car 100 in the hoistway 200 of the step (S11) will be described.

The First Implement of the First Embodiment

Figure 4:
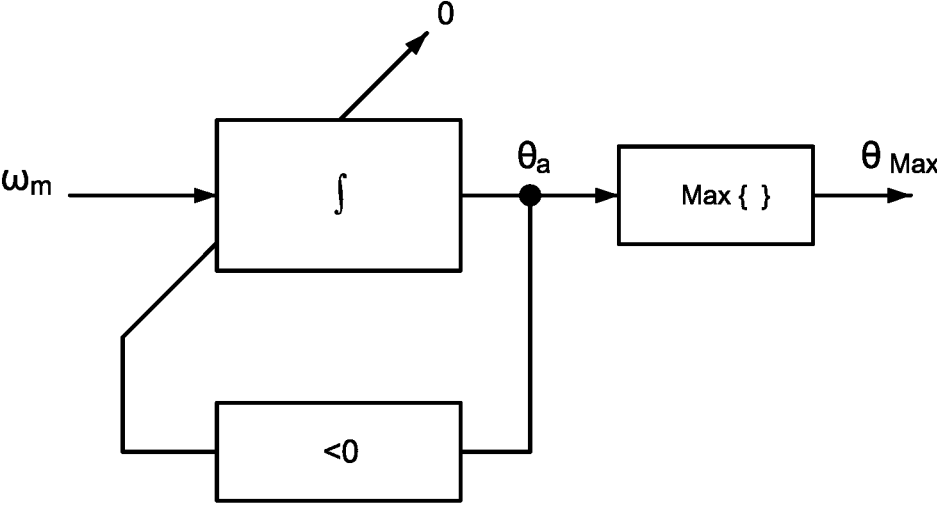
FIG. 4 is a block diagram of operating a maximum travel position according to a first embodiment of the present disclosure.
Figure 5:
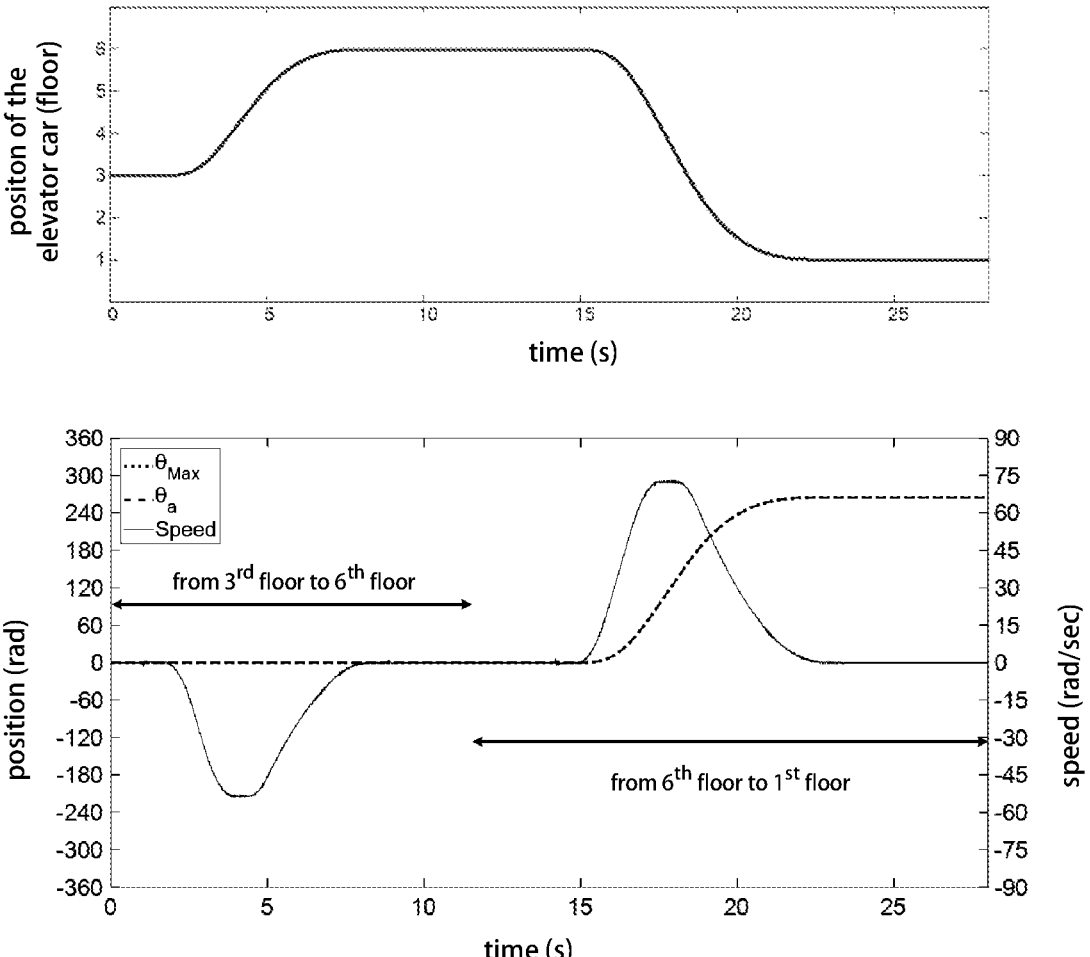
FIG. 5 is a schematic waveform of acquiring the maximum travel position according to a first implement of the first embodiment of the present disclosure.

Please refer to FIG. 4 and FIG. 5, which show a block diagram of operating a maximum travel position according to a first embodiment of the present disclosure and a schematic waveform of acquiring the maximum travel position according to a first implement of the first embodiment of the present disclosure, respectively, and also refer to FIG. 3A. The step (S11) includes detailed steps as: continuously calculating the integration value of motor speed when the elevator car 100 moves upward from the initial position $\theta_{a0}$ to the top of the hoistway 200, and specifying the integration value to be zero if the integration value is negative.

Afterward, controlling the elevator car 100 to move in the reverse direction (move reversely) to the bottom of the hoistway 200 and continuously integrating the integration value when the elevator car 100 moves to the bottom, and the integration value acquired by calculating the speed $\omega_m$ of the motor when the elevator car 100 moves from the top to the bottom has a maximum value, and the maximum value is the maximum travel position $\theta_{Max}$ of the elevator car 100 moving up and down between the top and the bottom of the hoistway 200.

Therefore, since the maximum travel distance of the elevator car 100 in the hoistway 200 is fixed, the integral of the motor speed of going back and forth once between the top and the bottom of the hoistway 200 must be zero. Using this feature, when the integral value acquired in the instant calculation is less than zero (negative), the integral value is cleared (that is, the integral value is specified to be zero). Therefore, as long as going back and forth once between the top and the bottom of the hoistway 200, the distance between the position of the elevator car 100 and the top of the hoistway 200 can be eliminated, and the initial position $\theta_{a0}$ and the maximum travel position $\theta_{Max}$ of the actual elevator car 100 can be acquired.

As shown in FIG. 5, in a first position interval (i.e., between the $3^{rd}$ floor and the $6^{th}$ floor) of the calculation in this implement, the initial position $\theta_{a0}$ is on the $3^{rd}$ floor, not the actual top floor ($6^{th}$ floor) of the hoistway 200. When the elevator car 100 moves upward from the initial position $\theta_{a0}$ to the top floor, that is, the process of moving up from the $3^{rd}$ floor to the $6^{th}$ floor in FIG. 5, since the elevator car 100 continuously moves upward, the integral of the motor speed is always less than zero (negative value) during the moving upward process. Therefore, forcibly specifying (i.e., designating) the integral value acquired in the moving upward process to be zero to update the actual zero point of the calculated travel. In a second position interval (i.e., between the $6^{th}$ floor and the $1^{st}$ floor) of the calculation in this implement, when the elevator car 100 starts from the top floor and moves downward to the bottom floor, the integral of the motor speed is always greater than zero during the moving downward process, and the maximum travel position $\theta_{Max}$ is continuously updated with its maximum value as the elevator car 100 moves downward from the $6^{th}$ floor to the $1^{st}$ floor. When the calculation of the second position interval is completed, the relative rotated angle of the motor and the maximum distance of operation when the corresponding elevator car 100 moves may be estimated. That is, when the elevator car 100 reaches the $1^{st}$ floor, the updated maximum value of the integral of the motor speed is the maximum travel position $\theta_{Max}$.

The Second Implement of the First Embodiment

Please refer to FIG. 4 and FIG. 6, which show a block diagram of operating a maximum travel position according to a first embodiment of the present disclosure and a schematic waveform of acquiring the maximum travel position according to a second implement of the first embodiment of the present disclosure, respectively, and also refer to FIG. 3B. The step (S11) includes detailed steps as: continuously calculating and updating the integration value when the elevator car 100 moves downward from the initial position $\theta_{a0}$ to the bottom of the hoistway 200.

Afterward, controlling the elevator car 100 to move in the reverse direction to the top of the hoistway 200 and continuously integrating the integration value when the elevator car 100 moves to the top, and specifying the integration value to be zero if the integration value is negative during the moving upward process.

Afterward, controlling the elevator car 100 to move in the reverse direction to the bottom again and continuously integrating the integration value when the elevator car 100 moves to the bottom, and the integration value acquired by calculating the speed $\omega_m$ when the elevator car 100 moves from the top to the bottom has a maximum value during the moving downward process, and the maximum value is the maximum travel position $\theta_{Max}$.

Therefore, since the maximum travel distance of the elevator car 100 in the hoistway 200 is fixed, the integral of the motor speed of going back and forth once between the top and the bottom of the hoistway 200 must be zero. Using this feature, when the integral value acquired in the instant calculation is less than zero, the integral value is cleared (that is, the integral value is specified to be zero). Therefore, as long as going back and forth once between the top and the bottom of the hoistway 200, the distance between the position of the elevator car 100 and the top of the hoistway 200 can be eliminated, and the initial position $\theta_{a0}$ and the maximum travel position $\theta_{Max}$ of the actual elevator car 100 can be acquired.

As shown in FIG. 6, in a first position interval (i.e., between the $4^{th}$ floor and the $1^{st}$ floor) of the calculation in this implement, the initial position $\theta_{a0}$ is on the $4^{th}$ floor, not the actual top floor ($6^{th}$ floor) of the hoistway 200. When the elevator car 100 moves downward from the initial position $\theta_{a0}$ to the bottom floor, that is, the process of moving down from the $4^{th}$ floor to the $1^{st}$ floor in FIG. 6. When the elevator car 100 moves to the $1^{st}$ floor, the speed of the motor is integrated to acquire the estimated position of the moving travel, and the maximum value of the position is updated. In a second position interval (i.e., between the $1^{st}$ floor and the $6^{th}$ floor) of the calculation in this implement, when the integral of the motor speed is less than zero (negative value) during the moving upward process, the integral value acquired in the moving upward process is forcibly specified (designated) to be zero to eliminate the distance $\theta_a$ between the position of the elevator car 100 and the bottom of the hoistway 200. In a third position interval (i.e., between the $6^{th}$ floor and the $1^{st}$ floor) of the calculation in this implement, the elevator car 100 moves downward from the actual top floor (i.e., the $6^{th}$ floor) to the actual bottom floor (i.e., the $1^{st}$ floor), the integral of the motor speed is always greater than zero during the moving downward process, and the maximum travel position $\theta_{max}$ is continuously updated with its maximum value as the elevator car 100 moves downward from the $6^{th}$ floor to the $1^{st}$ floor. When the calculation of the second position interval is completed, the relative angle of the motor and the maximum distance of operation when the corresponding elevator car 100 moves may be estimated. That is, when the elevator car 100 reaches the $1^{st}$ floor, the updated maximum value of the integral of the motor speed is the maximum travel position $\theta_{Max}$.

The First Implement of the Second Embodiment

Figure 7:
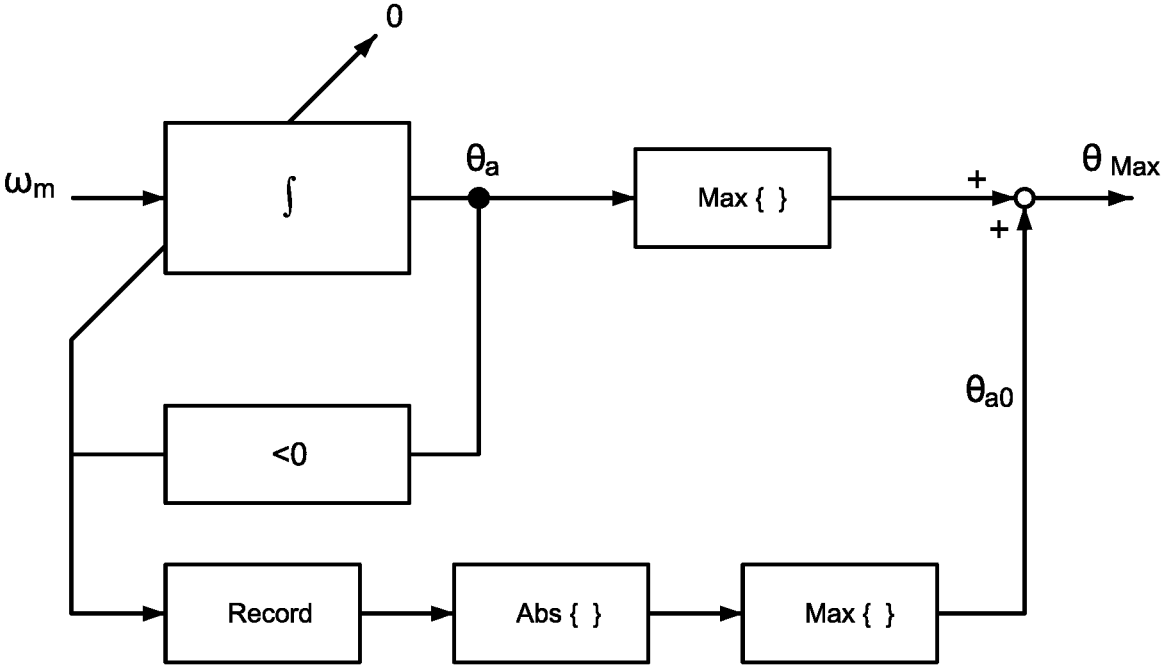
FIG. 7 is a block diagram of operating the maximum travel position according to a second embodiment of the present disclosure.
Figure 8:
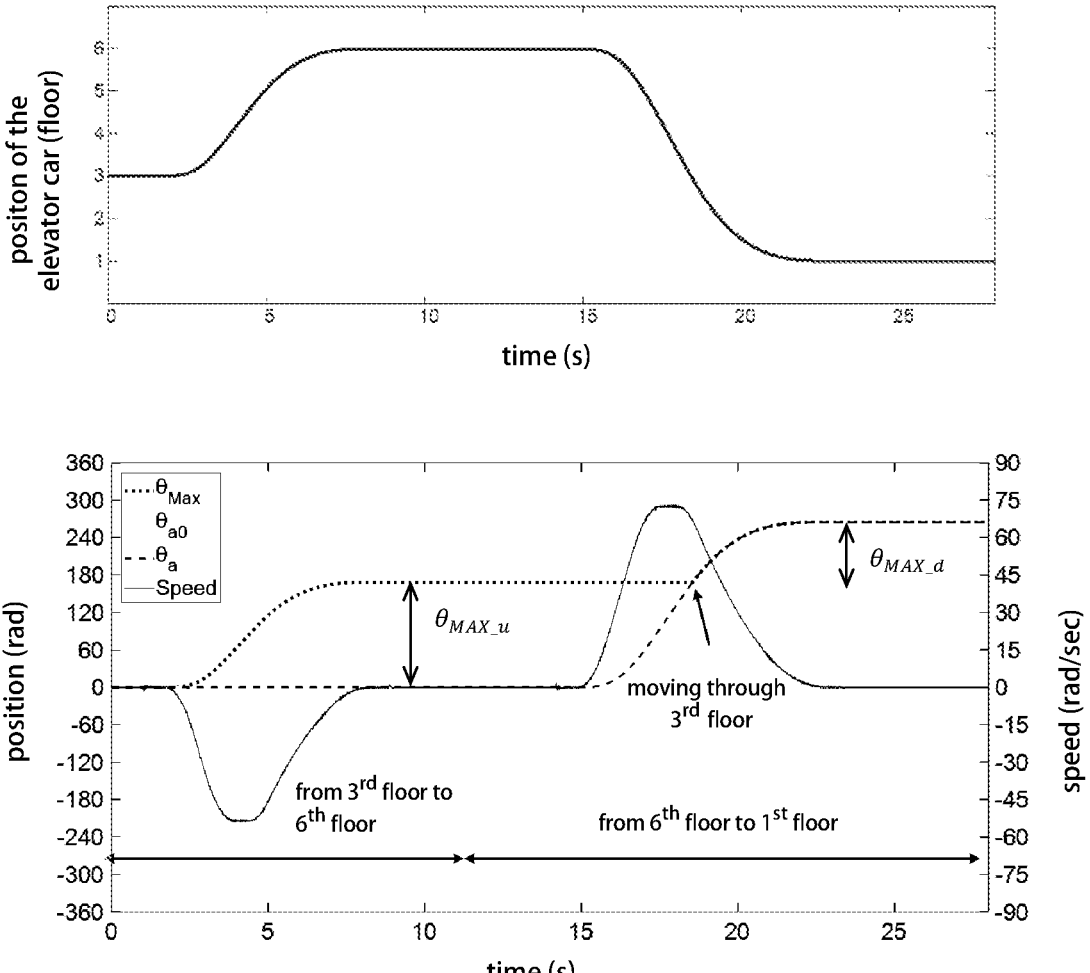
FIG. 8 is a schematic waveform of acquiring the maximum travel position according to a first implement of the second embodiment of the present disclosure.

Please refer to FIG. 7 and FIG. 8, which show a block diagram of operating the maximum travel position according to a second embodiment of the present disclosure and a schematic waveform of acquiring the maximum travel position according to a first implement of the second embodiment of the present disclosure, and also refer to FIG. 3B. The step (S21) includes detailed steps as: continuously calculating and updating the integration value when the elevator car 100 moves upward from the initial position $\theta_{a0}$ to the top of the hoistway 200, performing the absolute value calculation to the integration value if the integration value is negative, and recording the integration value as an upward position $\theta_{MAX\_u}$ when the elevator car 100 moves upward to the top. Incidentally, the block diagram shown in FIG. 7 also includes the calculations of the specified integral value of zero and the specified maximum value as the maximum travel position in the first implement and the second implement of the above-mentioned first embodiment.

Afterward, controlling the elevator car 100 to move in the reverse direction to the bottom, starting to continuously calculate and update the integration value when the elevator car 100 moves through the initial position $\theta_{a0}$, and recording the integration value as a downward position $\theta_{MAX\_d}$ until the elevator car 100 moves downward to the bottom, and finally acquiring the maximum travel position $\theta_{Max}$ by according to the sum of the upward position $\theta_{MAX\_u}$ and the downward position $\theta_{MAX\_d}$.

As shown in FIG. 8, in a first position interval (i.e., between the $3^{rd}$ floor and the $6^{th}$ floor) of the calculation in this implement, the initial position $\theta_{a0}$ is on the $3^{rd}$ floor, not the actual top floor ($6^{th}$ floor) of the hoistway 200. When the elevator car 100 moves upward from the initial position $\theta_{a0}$ to the top floor, since the integral of the motor speed is always less than zero (negative value) during the moving upward process, the initial position $\theta_{a0}$ is forcibly specified (designated) to be zero, the integral values less than zero are recorded and processed to acquire the distance $\theta_a$ between the position of the elevator car 100 and the top of the hoistway 200, and the maximum travel position $\theta_{Max}$ can be corrected immediately. In a second position interval (i.e., between the $6^{th}$ floor and the $1^{st}$ floor) of the calculation in this implement, when the elevator car 100 starts from the top floor and moves downward to the bottom floor, the integral of the motor speed is always greater than zero during the moving downward process, and the maximum travel position $\theta_{Max}$ is continuously updated with its maximum value as the elevator car 100 moves downward from the $6^{th}$ floor to the $1^{st}$ floor. When the calculation of the second position interval is completed, the relative angle of the motor and the maximum distance of operation when the corresponding elevator car 100 moves may be estimated. In particular, the calculation method of this embodiment is to correct the maximum travel position $\theta_{Max}$ when the initial position $\theta_{a0}$ estimated is greater than the maximum travel position $\theta_{Max}$.

The Second Implement of the Second Embodiment

Please refer to FIG. 7 and FIG. 8, which show a block diagram of operating the maximum travel position according to a second embodiment of the present disclosure and a schematic waveform of acquiring the maximum travel position according to a second implement of the second embodiment of the present disclosure, and also refer to FIG. 3B. The step (S21) includes detailed steps as: continuously calculating and updating the integration value when the elevator car 100 moves downward from the initial position $\theta_{a0}$ to the bottom, and recording the integration value as a downward position $\theta_{MAX\_d}$ when the elevator car 100 moves to the bottom.

Afterward, controlling the elevator car 100 to move in the reverse direction to the top, starting to continuously calculate and update the integration value when the elevator car 100 moves through the initial position $\theta_{a0}$, performing the absolute value calculation to the integration value if the integration value is negative, and recording the integration value as an upward position $\theta_{MAX\_u}$ until the elevator car 1100 moves to the top, and finally acquiring the maximum travel position $\theta_{Max}$ by according to the sum of the upward position $\theta_{MAX\_u}$ and the downward position $\theta_{MAX\_d}$.

Figure 9:
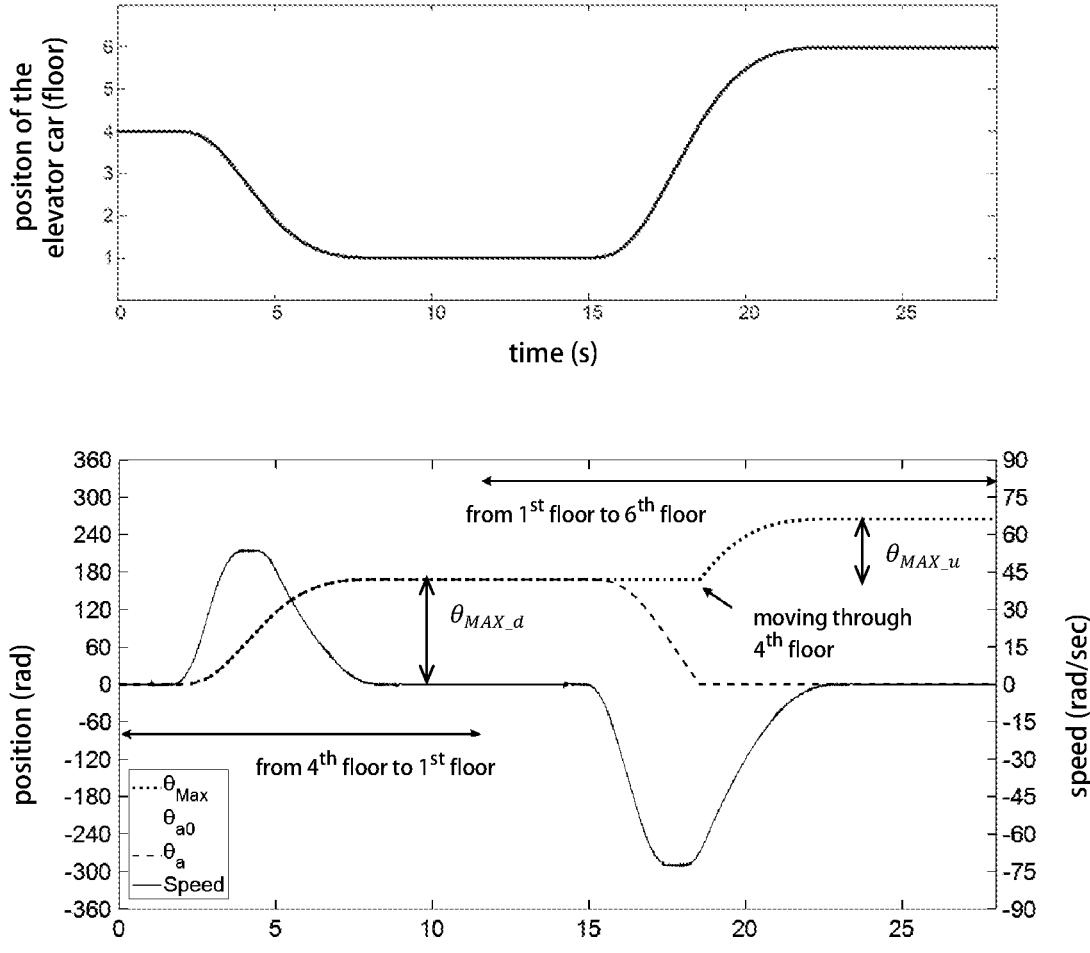
FIG. 9 is a schematic waveform of acquiring the maximum travel position according to a second implement of the second embodiment of the present disclosure.

As shown in FIG. 9, in a first position interval (i.e., between the $4^{th}$ floor and the $1^{st}$ floor) of the calculation in this implement, the initial position $\theta_{a0}$ is on the $4^{th}$ floor, not the actual top floor ($6^{th}$ floor) of the hoistway 200. When the elevator car 100 moves downward from the initial position $\theta_{a0}$ to the bottom floor, that is, the process of moving downward from the $4^{th}$ floor to the $1^{st}$ floor in FIG. 9. When the elevator car 100 moves to the $1^{st}$ floor, the speed of the motor is integrated to acquire the estimated initial position $\theta_{a0}$, and the maximum value of the positon (i.e., the maximum travel position $\theta_{Max}$) is updated. In a second position interval (i.e., between the $1^{st}$ floor and the $6^{th}$ floor) of the calculation in this implement, when the integral of the motor speed is less than zero (negative value) during the moving upward process, the initial position $\theta_{a0}$ is forcibly specified (designated) to be zero, the integral values less than zero are recorded and processed to acquire the distance $\theta_a$ between the position of the elevator car 100 and the top of the hoistway 200, and the maximum travel position $\theta_{Max}$ can be corrected immediately. That is, when the elevator car 100 reaches the $6^{th}$ floor, the updated maximum value of the integral of the motor speed is the maximum travel position $\theta_{Max}$.

Furthermore, the step (S12) or the step (S22), i.e., estimating the rope load constant of the wire rope according to the initial position $\theta_{a0}$ and the maximum travel position $\theta_{Max}$ when the motor operates at a constant speed, will be described in detail with hereinafter.

When considering the change of the length of the wire rope, the motor mechanical motion equation may be expressed in equation (2) as follows.

$$J_m \frac{d}{dt}\omega_m = T_e + T_p + T_c + T_{rc} - T_{rw} - T_w - B_m\omega_m \qquad \text{equation (2)}$$

In which, $J_m$ is the moment inertia, $T_e$ is the motor output torque, $T_p$ is the load torque generated by passengers, $T_c$ is the load torque generated by the elevator car, $T_{rc}$ and $T_{rw}$ are the load torques generated by the change of the wire rope on the car side and the counterweight side, respectively, $T_w$ is the load torque generated by the counterweight, and $B_m$ is the viscous friction coefficient.

The rope load is related to the position of the elevator car, and expressed as equations (3a) and (3b) as follows.

$$T_{rc}=K_r\theta_a \qquad \text{equation (3a)}$$

$$T_{rw}=K_r(\theta_{Max}-\theta_a) \qquad \text{equation (3b)}$$

In which, $K_r$ is the rope load constant.

The equations (3a) and (3b) are substituted into the equation (2) to acquire the equation (4) as follows.

$$J_m \frac{d}{dt}\omega_m = T_e + T_p + T_c + K_r\theta_a - K_r(\theta_{Max} - \theta_a) - T_w - B_m\omega_m \qquad \text{equation (4)}$$

After simplifying the equation (4), the equation (5) is acquired as follows.

$$J_m \frac{d}{dt}\omega_m = T_e + T_p + T_c + K_r(2\theta_a - \theta_{Max}) - T_w - B_m\omega_m \qquad \text{equation (5)}$$

Since the step (S12) or the step (S22) is to estimate the interference torque of both sides of the wire rope relative to the motor traction when the motor is controlled to rotate at a constant speed, the equation (5) may be rewritten as follows.

12

$$0=T_e+T_p+T_c+K_r(2\theta_a-\theta_{Max})-T_w-B_m\omega_m \qquad \text{equation (6)}$$

After shifting the equation (6), the motor output torque may be acquired as follows.

$$T_e=-T_p-T_c-K_r(2\theta_a-\theta_{Max})+T_w+B_m\omega_m \qquad \text{equation (7)}$$

Afterward, the motor output torque is differentiated to the angle, the equation (8) is acquired as follows.

$$\frac{\partial T_e}{\partial \theta} = -2K_r \qquad \text{equation (8)}$$

After shifting the equation (8), the rope load constant is represented as follows.

$$K_r = \frac{-1}{2}\frac{\partial T_e}{\partial \theta} \qquad \text{equation (9)}$$

Furthermore, the step (S13) or the step (S23), i.e., estimating the car and counterweight load torque relative to the motor according to the car weight of the elevator car and a counterweight weight of the counterweight when the motor operates at a zero speed, and the step (S14) or the step (S24), i.e., estimating the interference torque relative to the motor according to the rope load torque and the car and counterweight load torque, and performing the feedforward compensation to the motor based on the interference torque, will be described in detail with hereinafter.

Following the equation (5), the torque equation considering the change of the length of the wire rope is represented as follows.

$$J_m \frac{d}{dt}\omega_m = T_e + T_p + T_c + K_r(2\theta_a - \theta_{Max}) - T_w - B_m\omega_m \qquad \text{equation (10)}$$

In which, the sum of the $T_c$ and $T_W$ is the car and counterweight load torque, $K_r(2\theta_a-\theta_{Max})$ is the rope load torque.

In an empty car (no person riding, that is, $T_p=0$), when the zero-speed motor control is performed, there is no need to estimate the interference torque caused by the weight of the passengers relative to the motor, and therefore equation (10) may be simplified and rewritten as follows.

$$0=T_e+T_c+K_r(2\theta_a-\theta_{Max})-T_w \qquad \text{equation (11)}$$

After shifting the equation (11), the car and counterweight load torque is represented as follows.

$$T_c-T_w=-T_e-K_r(2\theta_a-\theta_{Max}) \qquad \text{equation (12)}$$

The estimation of the position of the elevator car with equation (1) may be expressed as follows.

$$\hat{\theta}_a=\int\omega_m dt \qquad \text{equation (13)}$$

The estimation of the rope load torque with equation (9) may be expressed as follows.

$$\overline{K}_r = \frac{-1}{2}\frac{\partial T_e}{\partial \theta} \qquad \text{equation (14)}$$

The estimation of the car and counterweight load torque is represented as follows.

$$\hat{T}_c-\hat{T}_w=-T_e-K_r(2\theta_a-\theta_{Max}) \qquad \text{equation (15)}$$

In one embodiment, the torque feedforward compensation is set before releasing the brake as follows.

$$\hat{T} = \hat{T}_c - \hat{K}_r(2\hat{\theta}_a - \hat{\theta}_{Max}) + \hat{T}_w \qquad \text{equation (16)}$$

The total torque command may be represented as follows.

$$T_e{}^* = T_{ec}{}^* + \hat{T}_D{}^* \qquad \text{equation (17)}$$

Figure 10:
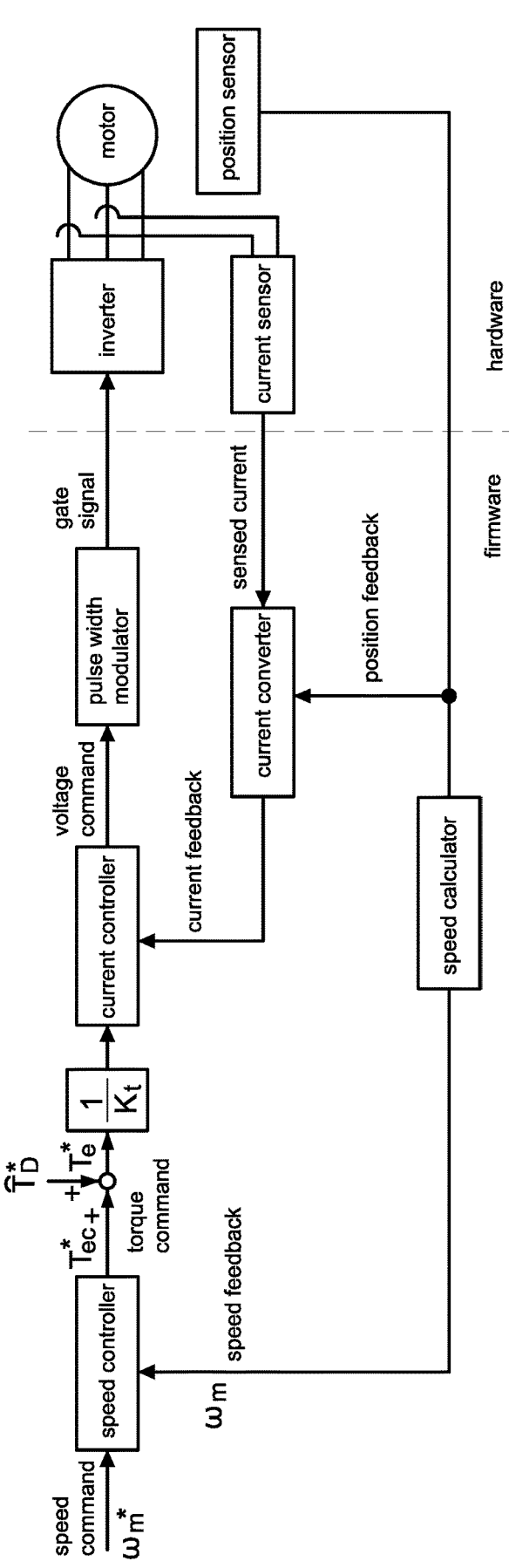
FIG. 10 is a block diagram of a motor drive system according to the present disclosure.

The equation (17) for the calculation of the feedforward compensation may be coordinated with the partial block diagram in the upper left part of FIG. 10. The total torque command of equation (17) is used for torque controlling (that is, $T_e = T_e{}^*$), and the calculated $T_e$ is substituted into the system motion equation (2), which may be expressed as follows.

$$J_m \frac{d}{dt}\omega_m = T_{ec} - \hat{T}_c - \hat{K}_r(2\hat{\theta}_a - \hat{\theta}_{Max}) + \qquad \text{equation (18)}$$

$$\hat{T}_w + T_p + T_c + K_r(2\theta_a - \theta_{Max}) - T_w - B_m\omega_m$$

When the estimated value is quite close to the actual value, the equation (18) may be simplified as follows.

$$J_m \frac{d}{dt}\omega_m = T_{ec} + T_p - B_m\omega_m \qquad \text{equation (19)}$$

In another embodiment, if the elevator car 100 has a load cell, the weight of the passenger in the elevator car 100 can be accurately estimated and the passenger load torque generated by the passenger weight relative to the motor can be calculated. Therefore, the equation (16) may be rewritten as follows.

$$\hat{T}_D = -\hat{T}_c - \hat{K}_r(2\hat{\theta}_a - \hat{\theta}_{Max}) + \hat{T}_w - T_p \qquad \text{equation (20)}$$

The total torque command may be represented as follows.

$$J_m \frac{d}{dt}\omega_m = T_{ec} - \hat{T}_c - \hat{K}_r(2\hat{\theta}_a - \hat{\theta}_{Max}) + \qquad \text{equation (21)}$$

$$\hat{T}_w - T_p + T_p + T_c + K_r(2\theta_a - \theta_{Max}) - T_w - B_m\omega_m$$

When the estimated value is quite close to the actual value, the equation (21) can be simplified as follows.

$$J_m \frac{d}{dt}\omega_m = T_{ec} - B_m\omega_m \qquad \text{equation (22)}$$

Please refer to FIG. 10, which shows a block diagram of a motor drive system according to the present disclosure. The motor drive system includes the architecture of hardware and firmware (or software) required for motor drive. In this motor drive system, an outer-loop control (i.e., a speed control for controlling the speed of the motor) and an inner-loop control (i.e., a current control for controlling the output of the motor) are provided. In the outer-loop control, a speed controller receives a speed command $\omega_m{}^*$ provided from a host computer, that is, a command of controlling the speed of the elevator car 100 (corresponding to the speed of the motor) is received. With a position feedback information provided by a position sensor, the actual speed of the elevator car 100 (corresponding to the actual speed of the motor) can be calculated through a speed calculator, and the speed information is fed back to the speed controller. Therefore, a current command, namely an equivalent torque command can be acquired according to the speed command $\omega_m$ and the fed speed information.

A current controller receives the current command and a current feedback of a sensed current measured by a current sensor of an inner-loop control loop to generate a voltage command. In particular, the sensed current is converted into the current feedback by a current converter, and the current converter can convert an a-b-c three-phase stationary coordinate to a d-q synchronous rotational coordinate. The voltage command is modulated and processed by a PWM (pulse width modulator) to generate a gate signal to control a converter to drive the motor.

Accordingly, the present disclosure provides different load torque estimators, including: (i) the estimation of floor or position of the elevator car, (ii) the estimation of the rope load constant for unbalanced load torque at two sides of the wire rope across the traction wheel, and (iii) the estimation for unbalanced load torque between the elevator car and the counterweight. The torque can be estimated before the elevator car is released and the rope length changes on both sides of the traction wheel as the height of the elevator car changes during the traveling process of the wire rope. Therefore, the torque feedforward compensation can be directly performed during the travel process through the rope load estimation so as to reduce the influence of the interference torque on the speed controller. In addition, through the feedforward torque compensation before the brake is released, the noise generated by the instantaneous current change after the brake is released can be effectively reduced, and the passengers' ride feeling can be effectively increased.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of estimating and compensating an interference torque of a lifting system, applied to a motor for driving the lifting system, the motor configured to drive a traction wheel to rotate, and a wire rope across the traction wheel configured to drive an elevator car to move upward and downward in a hoistway, the method of estimating and compensating the interference torque comprising steps of: (a) continuously integrating a speed of the motor and specifying an integration value obtained from the integration of the speed of the motor to be zero if the integration value is negative when the elevator car moves upward and downward between a top and a bottom of the hoistway from an initial position to acquire a maximum travel position of the elevator car in the hoistway, (b) estimating a rope load constant of the wire rope according to the initial position and the maximum travel position when the motor operates at a constant speed, and calculating a rope load torque according to the maximum travel position, the rope load constant, and a present position of the motor, (c) estimating a car and counterweight load torque according to a car weight of the elevator car and a counterweight weight when the motor operates at a zero speed, and (d) estimating an interference torque according to the rope load torque and the car and counterweight load torque, and performing a feedforward compensation applied to the motor for driving the lifting system based on the interference torque.

2. The method of estimating and compensating the interference torque as claimed in claim 1, wherein the step (a) comprises steps of:

(a1) continuously calculating the integration value when the elevator car moves from the initial position to the top, and specifying the integration value to be zero if the integration value is negative, and (a2) controlling the elevator car to move reversely to the bottom when the elevator car moves to the top, and continuously integrating the integration value, and the integration value acquired by calculating the speed when the elevator car moves from the top to the bottom has a maximum value, and the maximum value is the maximum travel position.

3. The method of estimating and compensating the interference torque as claimed in claim 1, wherein the step (a) comprising steps of:

(a1) continuously calculating and updating the integration value when the elevator car moves from the initial position to the bottom, (a2) controlling the elevator car to move reversely to the top when the elevator car moves to the bottom and continuously integrating the integration value, and specifying the integration value to be zero if the integration value is negative, and (a3) controlling the elevator car to move reversely to the bottom when the elevator car moves to the top and continuously integrating the integration value, and the integration value acquired by calculating the speed when the elevator car moves from the top to the bottom has a maximum value, and the maximum value is the maximum travel position.

4. The method of estimating and compensating the interference torque as claimed in claim 1, wherein the step (d) comprising steps of:

(d1) estimating the interference torque according to the rope load torque and the car and counterweight load torque, (d2) calculating a compensation torque for the feedforward compensation to the motor according to the interference torque, and (d3) completing the feedforward compensation in a time interval according to the compensation torque under the zero speed control.

5. The method of estimating and compensating the interference torque as claimed in claim 4, wherein the time interval is a difference between the present time and a releasing time of the lifting system; in the step (d3), calculates a compensation current slope according to the compensation torque and the time interval, and completes the feedforward compensation of the compensation torque in the time interval according to the compensation current slope.

6. The method of estimating and compensating an interference torque as claimed in claim 1, wherein the step (d) is performed when the elevator car is empty.

7. The method of estimating and compensating an interference torque as claimed in claim 1, wherein the elevator car further comprises a weight sensor configured to sense a passenger load torque generated by the weight of passengers, wherein in the step (d), estimates the interference torque relative to the motor according to the rope load torque, the car and counterweight load torque, and the passenger load torque.

8. A method of estimating and compensating an interference torque of a lifting system applied to a motor for driving the lifting system, the motor configured to drive a traction wheel to rotate, and a wire rope across the traction wheel configured to drive an elevator car to move upward and downward in a hoistway, the method of estimating and compensating the interference torque comprising steps of: (a) continuously integrating a speed of the motor and performing an absolute value calculation to an integration value obtained from the integration of the speed of the motor if the integration value is negative when the elevator car moves upward and downward between a top and a bottom of the hoistway from an initial position to acquire a maximum travel position of the elevator car in the hoistway, (b) estimating a rope load constant of the wire rope according to the initial position and the maximum travel position when the motor operates at a constant speed, and calculating a rope load torque according to the maximum travel position, the rope load constant, and a present position of the motor, (c) estimating a car and counterweight load torque according to a car weight of the elevator car and a counterweight weight when the motor operates at a zero speed, and (d) estimating an interference torque and performing a feedforward compensation applied to the motor for driving the lifting system based on the interference torque according to the rope load torque and the car and counterweight load torque.

9. The method of estimating and compensating the interference torque as claimed in claim 8, wherein the step (a) comprises steps of:

(a1) continuously calculating and updating the integration value when the elevator car moves from the initial position to the top, performing the absolute value calculation to the integration value if the integration value is negative, and recording the integration value as an upward position when the elevator car moves to the top, (a2) controlling the elevator car to move reversely to the bottom, starting continuously to calculate and update the integration value when the elevator car moves through the initial position, and recording the integration value as a downward position until the elevator car moves to the bottom, and (a3) acquiring the maximum travel position by according to the sum of the upward position and the downward position.

10. The method of estimating and compensating the interference torque as claimed in claim 8, wherein the step (a) comprises steps of:

(a1) continuously calculating and updating the integration value when the elevator car moves downward from the initial position to the bottom, and recording the integration value as a downward position when the elevator car moves to the bottom, (a2) controlling the elevator car to move reversely to the top, starting continuously to calculate and update the integration value when the elevator car moves through the initial position, performing the absolute value calculation to the integration value if the integration value is negative, and recording the integration value as an upward position until the elevator car moves to the top, and (a3) acquiring the maximum travel position by according to the sum of the upward position and the downward position.

11. The method of estimating and compensating the interference torque as claimed in claim 8, wherein the step (d) comprising steps of:

(d1) estimating the interference torque according to the rope load torque and the car and counterweight load torque, (d2) calculating a compensation torque for the feedforward compensation to the motor according to the interference torque, and (d3) completing the feedforward compensation in a time interval according to the compensation torque under the zero speed control.

12. The method of estimating and compensating the interference torque as claimed in claim 11, wherein the time interval is a difference between the present time and a releasing time of the lifting system; in the step (d3), calculates a compensation current slope according to the compensation torque and the time interval, and completes the feedforward compensation of the compensation torque in the time interval according to the compensation current slope.

13. The method of estimating and compensating an interference torque as claimed in claim 8, wherein the step (d) is performed when the elevator car is empty.

14. The method of estimating and compensating an interference torque as claimed in claim 8, wherein the elevator car further comprises a weight sensor configured to sense a passenger load torque generated by the weight of passengers, wherein in the step (d), estimates the interference torque relative to the motor according to the rope load torque, the car and counterweight load torque, and the passenger load torque.

* * * * *